UNITED STATES PATENT OFFICE.

AUGUST VOELKER, OF EHRENFELD, GERMANY.

MANUFACTURE OF GLASS BY ELECTRICAL HEATING.

SPECIFICATION forming part of Letters Patent No. 702,081, dated June 10, 1902.

Application filed September 27, 1900. Serial No. 31,312. (Specimens.)

*To all whom it may concern:*

Be it known that I, AUGUST VOELKER, a subject of the King of Prussia, Emperor of Germany, residing at Ehrenfeld, in the Kingdom of Prussia, German Empire, have invented certain new and useful Improvements in the Manufacture of Glass by Electrical Heating, (for which I have applied for patents in England, No. 12,673, dated July 13, 1900; in Germany, dated June 28, 1900; in Austria, dated July 13, 1900, and in Switzerland, No. 24,403, dated July 14, 1900,) of which the following is a specification.

The melting of the mixed raw materials for the manufacture of glass has been effected by electrical heating, but only by passing the materials through the electric arc.

The invention relates to an improvement in the manufacture of glass by electrical heating wherein the materials are melted by making them a resistance in an electric circuit, so that the electric arc, with its special leads and refractory furnace materials, is not required.

For this purpose the ground raw materials for making the glass are mixed with the material, which is itself a conductor at ordinary temperatures, so that a current may be passed through the mixture from the beginning of the operation. For example, the raw materials are intimately mixed with graphite, powdered charcoal, or the like sufficient to render the glass conductive, and the proportion of carbonaceous material employed is usually about ten per cent. In order to enable the carbon to pass off in the form of carbon dioxid, it is usual in practice to add suitable substances containing oxygen—such, for example, as saltpeter. The carbon added to the glass is chemically combined with the oxygen to form carbonic acid as soon as the glass has been melted. The carbon can therefore not affect the glass in any respect. Of course only perfectly-pure carbon is used, such as contains but a fractional percentage of other substances, which latter being mostly the oxids of metals can, at the most, only somewhat color the glass. In most cases the percentage of foreign substances is so small as not to have any effect whatever. Other substances that may be used instead of carbon are the oxids of metal (brownstone) or, indeed, metals themselves, such as iron, (powder,) silver, &c. The metals have, however, the disadvantage of somewhat coloring the glass and should, therefore, only be used when colored glass is to be produced. The mixture is then formed into a part of a circuit carrying a continuous or alternating current.

What I claim, and desire to secure by Letters Patent of the United States, is—

An improvement in the manufacture of glass by electrical heating, consisting in intimately mixing the ground raw materials with a conducting material and melting the mixture by forming it into a part of a circuit carrying an electric current, substantially as described.

In testimony whereof I have hereunto set my hand in the presence of two witnesses.

AUGUST VOELKER.

Witnesses:
 CHARLES L. SIMPLE,
 KARL SCHMITT.